United States Patent [19]

West et al.

[11] Patent Number: 5,459,181
[45] Date of Patent: Oct. 17, 1995

[54] HYDRAULIC BINDER COMPOSITION AND ITS USES

[75] Inventors: Hugh West, Auburn; Ezequeil Delgado-Fornue, Seattle, both of Wash.

[73] Assignee: Weyerhaeuser Company, Tacoma, Wash.

[21] Appl. No.: 96,082

[22] Filed: Jul. 23, 1993

[51] Int. Cl.⁶ .............................. C08L 97/02; C08K 7/02
[52] U.S. Cl. .............................. 524/35; 524/55; 524/56; 524/598; 523/132
[58] Field of Search .............................. 524/35, 55, 56, 524/598; 523/132

[56] References Cited

U.S. PATENT DOCUMENTS

| | | | |
|---|---|---|---|
| 2,158,025 | 5/1939 | Hulst et al. | 61/36 |
| 3,644,171 | 2/1972 | Bevan et al. | 162/70 |
| 3,696,559 | 10/1972 | Hatton | 47/9 |
| 3,712,866 | 1/1973 | Falconer | 252/316 |
| 3,763,072 | 10/1973 | Kreiger | 260/29.6 S |
| 3,772,893 | 11/1973 | Eilers | 71/36 |
| 3,812,615 | 5/1974 | Jamison | 47/9 |
| 3,818,998 | 6/1974 | Hessert | 175/72 |
| 3,895,956 | 7/1975 | Yoshida et al. | 106/193 |
| 3,950,179 | 4/1976 | Schneider | 106/208 |
| 3,986,365 | 10/1976 | Hughes | 61/36 |
| 4,022,633 | 5/1977 | Schneider | 106/208 |
| 4,051,086 | 9/1977 | Reid | 260/17.4 GC |
| 4,128,692 | 12/1978 | Reid | 428/378 |
| 4,333,461 | 6/1982 | Muller | 128/284 |
| 4,369,597 | 1/1983 | Leep et al. | 47/9 |
| 4,414,776 | 11/1983 | Ball | 47/56 |
| 4,415,463 | 11/1983 | Mosier et al. | 252/8.55 R |
| 4,432,666 | 2/1984 | Frey et al. | 405/129 |
| 4,624,868 | 11/1986 | Muller | 427/384 |
| 4,637,759 | 1/1987 | Owa et al. | 405/270 |
| 4,693,763 | 9/1987 | Ross et al. | 149/8 |
| 4,743,288 | 5/1988 | Hirsbrunner | 71/28 |
| 4,787,928 | 11/1988 | Balassa | 71/23 |
| 4,826,880 | 5/1989 | Lesniak et al. | 521/53 |
| 5,082,500 | 1/1993 | Nachtman et al. | 106/900 |
| 5,096,748 | 3/1992 | Balassa | 427/384 |

FOREIGN PATENT DOCUMENTS

| | | |
|---|---|---|
| 2851701A | 6/1980 | Germany . |
| WO91/08759 | 5/1992 | WIPO . |

OTHER PUBLICATIONS

Manufacturer's Literature, "Natrosol," Published by Hercules Incorporated, 1990, 20 pp.

Manufacturer's Literature of Industrial Mineral Ventures "Imvitone Organoclays & Clay Products," distributed by Seegott, Inc., 5400 Naiman Parkway, Solon, Ohio 44139, Date Unknown, 6 pp.

*Primary Examiner*—Kriellion S. Morgan

[57] ABSTRACT

A three-part dry blended soluble mixture which includes a water soluble hydroxyl group bearing polymer, a covalent crosslinking agent, and a catalyst is made into an aqueous solution which is then applied to any underlying material of choice. After drying, the crosslinked polymer forms a material that is completely insoluble in water, thereby serving as a binder or tackifier. One additive that may be included with the dry blend is wood fiber in an approximate weight ratio of nine to one and thereafter this dry blend is combined with water where the three-part dry blend goes into solution while the fibers remain in suspension. This composition is then spray applied to any underlying material and upon drying, there is formed a bonded fiber matrix which is relatively strong and which has many applications such as for use as an erosion control/seeding material, a covering for landfills, or a covering for other particulate materials stored in an outside location. The insoluble polymer with or without the fiber will biodegrade over time in an outdoor environment.

9 Claims, No Drawings

HYDRAULIC BINDER COMPOSITION AND ITS USES

BACKGROUND OF THE INVENTION

This invention relates generally to a binder or tackifier that dissolves readily in water but then upon drying becomes water insoluble through the formation of covalent crosslinks between polymer chains but thereafter remains biodegradable. In one form of the invention the binder is combined with lignocellulosic or synthetic mulch fiber in an aqueous slurry and sprayed over a ground area where, after drying, an effective erosion-control blanket is created.

There are many known "tackifier" compositions useful for loosely binding together many different kinds of particulate material. Tackifiers are used, for example, in hydraulic mulch applications where a slurry is prepared including fibrous material which is then sprayed over a ground area to perform various functions such as holding the mulch in place. In the same application seed may be included in the slurry or other additives such as fertilizers to promote growth of plants which ultimately control erosion. A dye is usually added, as well, to aid visually in the ground application. One well known tackifier is a water soluble polysaccharide but the problem in their use is that they remain water soluble after the spraying and drying step so they quickly lose their effectiveness after exposure to rain or moist soil. For this reason such sprayed mulches do not perform as well in erosion control as preformed blankets of natural or synthetic fibers.

Another example where water soluble tackifiers have been used is as components of spray systems applied to garbage piles. Such systems, after drying, serve as landfill covers. Again, in the past, these systems have had only poorly defined water resistance due to the failure to chemically insolubilize the water soluble binder component.

Another example of an application of typical known water soluble tackifier compounds was over wood chip piles to generally hold the surface in place to prevent wind erosion. As mentioned, unmodified water soluble polymers are widely used in the erosion control field as binders or tackifiers either with hydraulic mulch or as an overspray on hay or straw that has been spread to control erosion. Unmodified polymers remain water soluble after drying and consequently during the first subsequent rain they redissolve and are generally washed away from the covering and binding function they perform with respect to the mulch fiber and the underlying soil. This renders the resistance of such polymers to wind erosion transient and the resistance to rain erosion is very poor since the polymer survives for only a short time once it rains. Unmodified polymers are exemplified by a family of natural plant "gum" polysaccharides such as guar, locust bean, plantago and the like although some synthetic polymers, for example polyacrylamides are used to a limited extent.

The unmodified water soluble polymers like the natural polysaccharide gums degrade very rapidly in the environment due to biological action. A solution of guar gum and water containing soil bacteria can lose over half its initial viscosity (an indicator of polymer chain length) in only 24 hours. Even in the absence of significant rain to dissolve the polymer, the ground contact life span of unmodified polymers is relatively short as a result of the biological action. It is widely recognized in polymer science that the act of insolubilizing and covalently crosslinking a polymer will retard the rate of its biological breakdown without preventing its ultimate decay into harmless products, principally carbon dioxide and water in this case of a polysaccharide.

Various systems are known in the art for causing the gelation of natural polysaccharide gums in the wet state. Such systems are widely used in the oil well drilling industry for rheology control of drilling fluids. Certain of these systems are based on chemistry involving the heavy metals antimony and chromium (for example, U.S. Pat. No. 3,644,171 discloses the use of the metal based crosslinking agent trademarked "C-20" sold by Steinhall and Company). It is believed gelation in the wet state is brought about by the formation of non-covalent bonds in complexes formed between the metals and the polysaccharide. Certain of these complexes do resist rehydration after drying. However, the heavy metals, antimony and chromium, are not among the elements that are known to be essential for plant growth. The addition of these elements to the soil is therefore undesirable and the presence of "heavy metals" in a tackifier product for use in the environment is widely recognized as being undesirable. Furthermore, the gelation of these systems in the wet state is undesirable from the standpoint of being able to spray the product through a hose from a pump driven hydroseeding machine. Solutions to this undesirable feature have been proposed, for example U.S. Pat. No. 3,712,866 discloses a two-tank spray system whereby the binder or tackifier and the gelling agent are brought together and mixed in the nozzle of the spray apparatus. However, this system requires special equipment that is not commonly available in the hydroseeding industry.

In the erosion-control industry it is known to utilize various latex polymers as alternatives to the natural gum based tackifiers. These polymers are utilized for the same basic functions, that is, to bind particulate matrices together to both stabilize soil and protect a seeding process to enhance natural growth. Usually these latexes are supplied predispersed in water in large barrels or drums which are very heavy and difficult to handle on top of normal hydroseeding machines from which location loading takes place through a hatchway. Splashing and spillage readily occur with these liquid materials. It would be desirable to provide a dry tackifier compound thereby eliminating the use of large barrels or drums on the hydroseeding machine. Another disadvantage in using latexes dispersed in water is that they are very low viscosity compared to the viscous solutions that can be readily prepared from water soluble polymers. The viscosity of the latex as supplied is further reduced when diluted in the water used to apply the material in an erosion control application. These low viscosity latexes when used to bond fibrous mulches readily drain through the mulch fiber and are lost to the soil leaving the mulch relatively unbonded after drying. This loss of binding or tackifying material is an inefficient use of materials and means that a larger quantity of latex polymer is needed to effectively bond the mulches for the intended application simply increasing the cost.

As alluded to earlier premixed dry blends of unmodified water soluble polymers and lignocellulosic fiber are known in the art and used as erosion control materials and examples of such materials can be seen by referring to U.S. Pat. Nos. 4,297,810 and 3,881,278. These materials are supplied to the erosion control industry as prepackaged, easy-to-handle tackified mulches. However, given the binders used, remaining soluble after spraying and drying they lack the longer-term protective properties of the present invention.

In the hydroseeding application for the present invention, the object of using mulch along with the seed is to protect the seed and provide a suitable microclimate while it germinates. The control of erosion on the site is ultimately the result of the plants becoming established. The mulch itself provides for some modest erosion control protection during the germination and growth of the plants. Where conditions dictate more severe erosion potential (steep slopes, heavy rainfall, unstable soils), erosion-control blankets are used which are preformed mats of fibers (for example, straw, coconut fiber, wood shavings and the like held by gluing or stitching to a light web of synthetic fiber) that come in roll form. These materials are rolled out onto the ground that has first been seeded, for example by hydroseeding and held in place by metal staples that are hammered into the soil. These blanket materials are costly to buy and expensive and time consuming to install due to the requirement that a relatively smooth surface be prepared to accept the blanket, the separate seeding step and finally the utilization of staples being hammered into the ground to secure the blanket.

In the landfill application where landfills are periodically covered with a protective layer of a suitable material, one common practice is by using a complete covering of topsoil on a daily basis of about six inches in depth. This is a costly process. An alternative is proposed and disclosed in U.S. Pat. No. 5,082,500 where a spray applied system includes the use of a water soluble polymer, wood fiber combination and certain other additives which will function to cover the landfill and perform for a period of time. It, however, does not disclose an insoluble binder composition.

Accordingly from the foregoing, one object of the present invention is to provide a tackifier or binder composition as a dry mixture that dissolves readily only once to allow for application by spraying and thereafter becomes insoluble upon drying.

Another object of the invention is to provide a tackifier or binder after application and curing whose rate of biological decay is retarded but still ultimately decays into harmless products.

Still another object is to provide the tackifying material as a dry powder to an application site where it is then mixed with the application fluid thereby avoiding heavy drums of liquid compounds.

Still a further object is to provide a liquid tackifying application system that is a highly viscous solution reducing draining through a bed of mulch.

Yet another object is to provide a premixed fiber/binder system where the bonded fiber after application and drying has a high degree of resistance to wind and rain erosion.

Still a further object is to eliminate the use of preformed erosion-control blankets by providing a low-cost, one-step spray system.

These and other objects of the present invention will become readily apparent upon reading the specification to follow.

SUMMARY OF THE INVENTION

In one form this invention is a composition of matter useful as a tackifier or binder in erosion control applications, mulching applications, dust control applications, and landfill applications. The composition is a three-part formulation including a combination of any water soluble hydroxyl group bearing polymer, for example a guar gum or hydroxyethyl cellulose with an amine/formaldehyde condensate prepolymer bearing two or more methylol groups, for example dimethylolurea as a covalent crosslinking agent and an acid or base catalyst, for example ammonium sulphate to promote the reaction between the polymeric binder and crosslinking agent at room temperature. The composition has the property of dissolving readily in cold water and will not gel upon standing and whereafter drying of the water under ambient conditions the resultant material becomes insoluble in water.

In another form of the invention the dry binder or tackifier having the properties and constituents just described is combined with a lignocellulosic or synthetic fiber as a dry blend which can then be used for many different applications.

In still another form of the invention the dry blend just described including the fiber material is mixed with water at a predetermined solids/water ratio with the optional addition of seeds and/or fertilizer and then sprayed over soil. This wet composition is allowed to dry and thereafter provides a seeding and erosion control function.

Still other forms of the invention include using the aqueous form of the composition at a predetermined solids/water ratio with the optional addition of various fillers or extenders which will then be sprayed over the surface of garbage piles (landfills), wood chip piles or piles of any loose particulate material stored outdoors that require temporary protection from wind and rain erosion.

DESCRIPTION OF THE INVENTION AND PREFERRED EMBODIMENTS

The invention as a composition of matter in its broad form is a three-part formulation including any water soluble hydroxyl group (—OH) bearing polymer with a preferred binder being guar gum, a galactomannan polysaccharide derived from the plants cyamopsis tetragonolobus and psoraloides at about 10 parts by weight. The second ingredient is a covalent crosslinking agent comprised of an amine/formaldehyne condensate prepolymer bearing two or more methylol groups (—CH$_2$OH) and preferably dimethylolurea at one part by weight (a suitable range being 0.01 to 5 parts by weight). The third ingredient is an acid or base catalyst (either Lewis or protic in nature) to promote the reaction between the polymeric binder and crosslinking agent at room temperature, preferably ammonium sulphate in an amount of approximately 0.67 parts be weight (a suitable weight range being 0.01 to 5 parts by weight). An optional fourth component may be added to function as a scavenger of any vapor phase formaldehyde that may be present at low levels in the crosslinking agent. Preferably the additional component is ammonium bicarbonate which is added at approximately 0.24 parts by weight (a range is from 0 to 5 parts by weight). This formaldehyde scavenger also provides extended shelf life for the composition.

In the preferred embodiment of the composition the components are dry blended in the aforementioned amounts and it is this dry blend that has the property of dissolving readily in cold water which will not gel upon standing but once dried under ambient conditions will yield a binder or tackifying material which has become completely insoluble in water. As will be further described later, it is the aqueous form of the composition that has many useful applications and where other additives may be included within the aqueous slurry.

Other compounds known to provide useful results when mixed to form the dry blended formulation are hydroxyethyl cellulose as a substitute for the guar gum polymeric binder, tri-methylol melamine as a substitute for the dimethylolurea crosslinking agent, and ammonium nitrate as a substitute for the ammonium sulphate catalyst. Other compounds believed to work if included in the formulation are any hydroxyl group (—OH) bearing polymer as a substitute for the guar gum. For example, other polysaccharide gums (locust bean, plantago, etc.), and polyvinyl alcohol. Any compound bearing two or more methylol groups (—CH$_2$OH) as a substitute for the dimethylolurea is believed to be a functional equivalent. For example, a low molecular weight urea/formaldehyde resin. Other catalysts that should function properly include any acid or base (either protic or lewis in nature). It is also believed that any known formaldehyde scavenging agent should perform as a substitute for the ammonium bicarbonate.

Once the individual ingredients are blended into the dry blend in the appropriate amounts, a suitable liquid will be added to form a slurry, most preferably cold water. To effectively formulate the tackifier or binder composition for spraying it has been found that a mixture comprising a suitable amount of water to permit the dissolved compounds to be used in existing spray systems will work. Once the dry blend of the mixed chemicals is in solution the aqueous material may then be sprayed over any material where loose particles are located. After drying takes place and crosslinking occurs, then the resultant polymer matrix will be completely insoluble.

When the above-described dry blended tackifying mixture is to be used in combination with fiber whereby the multipart mixture can then be utilized for seeding and erosion control products, the preferred fiber additive is alderwood fiber (such as one produced by Weyerhaeuser Company, Tacoma, Wash. under the trademark Silva-fiber). With the binder or tackifying composition blended according to the above-described weights, the preferred amount of the binder composition will be 10% by weight of the total blended weight including fiber (an acceptable range will be from 1 to 30% by weight of the total blended weight). Since the alderwood fiber is in dry form the blend will remain in dry form and can be suitably packaged for shipment as a dry mixture. Other fibers known to be useful include aspen fiber, fiberized mixed wastepaper or staple synthetic fiber which can substitute in whole or in part for the preferred alderwood fiber. Any lignocellulosic fiber or synthetic fiber of a size that can be properly handled in known application equipment, such as hydroseeding machines, may be substituted in whole or in part for the aforementioned fiber material, for example, recycled paper, hay, straw, fiberized wood construction waste, fiberized rag stock and the like.

Similar to the dry blend without fiber this composition including the fiber additive in an approximate amount of 90% by weight of the total blend can then be combined with water or any other suitable liquid in which the binder components will dissolve while the fibers remain in a state of suspension. It is this aqueous form which can then be applied using any suitable known commercially available application means such as a sprayer to distribute the binder fiber solution. Upon drying, as has been stated previously, the polymer, through crosslinking, becomes insoluble thereby binding not only the fibers within the matrix to themselves but also to any substrate which is underlying the sprayed material.

One very useful application for the present invention is where the composition including the preferred alder fiber is mixed with water in a suitable application means such as a conventional hydroseeder wherein a suitable range will be about 300–500 pounds of the dry blended material to 1,000 gallons of water. For this particular application seed and fertilizer can be added to the mix (at the normal rates used in conventional hydroseeding). After mixing for about 15 minutes a thick slurry of suspended fibers and seeds is formed while the three-part blend of binder, covalent crosslinking agent, and catalyst is dissolved along with the fertilizer, if added. This mixture is spray applied to the ground at a rate (coverage) of 3,000 pounds of the active composition (excluding the weight of the added water) to the acre (range being about 1,000 to 5,000 pounds per acre) to form a complete blanket-like cover. The sprayed on material is allowed to dry aided by the natural elements of sun and wind. The resultant bonded fiber matrix resists erosion by strong wind and heavy rain but readily allows seeds to germinate and grow up through the fiber matrix. As previously explained, the resulting crosslinked binder is now insoluble but nevertheless is biodegradable over a reasonable amount of time, ultimately decaying into harmless products, principally carbon dioxide and water.

Another end use of one of the compositions of the present invention is the covering of piled garbage. In this application in one embodiment 400 pounds of the dry-blended composition including wood fiber is mixed with 1,000 gallons of water in a conventional hydroseeder (or any multiple of this ratio with the range being from about 200 to 600 pounds per 1,000 gallons of water). After mixing for about 15 minutes, a thick slurry forms and this slurry is then spray applied to the surface of piled garbage at landfills and the like. Because of the weight of the aqueous slurry in the wet state and the water resistant bonded crust which forms in the dry state, the material prevents wind from blowing the garbage out of the landfill. A composition useful for this application may be modified by replacement of up to three quarters of the fiber component by any inert low-cost filler material, such as chalk, powdered clay, ash, mining waste or the like. This substitution can be made given the reduced need for strength and erosion resistance for this particular intended use compared to that in the seeding and soil erosion control process described earlier. As a result, a relatively lower-cost system is provided.

The present invention has been broadly described as having additional compounds where certain additives provide for alternative end uses. For example, in the broad form the three-part dry blend when mixed with water will form an aqueous sprayable solution which can be applied to any material of interest. Upon drying the crosslinked material will be insoluble thereby forming a polymer film. When the fibrous material is added and the dry blended four-part material is mixed with water it can then be sprayed over the ground for hydroseeding and erosion control purposes or over such things as landfills, wood chip piles, and the like. After drying the bonded fiber matrix will form a protective covering holding the underlying material in place yet is a material which remains biodegradable over time.

Thus, what has been described is a very useful basic three-part dry blended mixture forming the binder components that when added to water can be applied to any underlying material and after drying forms an insoluble binding material. While a detailed description of the invention has been provided and preferred embodiments disclosed, changes and modifications may occur to those skilled in the art. All such changes and modifications are intended to be included within the scope of the appended claims.

We claim:

1. A dry blend composition that is initially a mixture that is soluble in water, but, after being admixed with water and allowed to dry, said composition becomes a water insoluble, cross-linked polymer, said dry blend composition comprising:

about ten parts by weight of a water soluble hydroxyl group bearing polymer, 0.01 to 5 parts by weight of an amine/formaldehyde condensate pre-polymer bearing two or more methylol groups as a cross-linking agent for said hydroxyl group bearing polymer, and an effective amount of an acid or base catalyst to enhance the reaction between the amine/formaldehyde condensate pre-polymer and said cross-linking agent.

2. The composition of claim 1 further including a formaldehyde scavenging compound present in an amount of from 0 to 5 parts by weight.

3. The composition of claim 1 further including fibers as an additive to the water soluble mixture.

4. The composition of claim 3 wherein the fibers are wood fibers.

5. A water insoluble, cross-linked polymer material useful as a binder which is formed by dissolving in water, and thereafter being allowed to dry, a three-part dry blend comprising:

water soluble hydroxyl group bearing polymer, present in about ten parts by weight, an amine/formaldehyde condensate pre-polymer bearing two or more methylol groups as a cross-linking agent for said hydroxyl group bearing polymer, in an amount of from 0.01 to 5 parts by weight, and an acid or base catalyst in an amount effective to enhance the reaction between the hydroxyl group bearing polymer and crosslinking agent.

6. The insoluble polymer of claim 5 further including fibers which are suspended in the aqueous solution and after drying are part of a fiber-polymer matrix.

7. The polymer of claim 6 wherein the fibers are wood fibers.

8. The composition of claim 1 wherein said catalyst is present in an amount from 0.01 to about 5 parts by weight.

9. The composition of claim 5 wherein said catalyst is present in an amount from 0.01 to about 5 parts by weight.

* * * * *